US012729301B2

(12) United States Patent
Galiwango et al.

(10) Patent No.: US 12,729,301 B2
(45) Date of Patent: Sep. 8, 2026

(54) BIODEGRADGRADABLE DEVICES, AND METHODS OF MAKING THE SAME

(71) Applicant: United Arab Emirates University, Al Ain (AE)

(72) Inventors: Emmanuel Galiwango, Al Ain (AE); Ali Al Marzouqi, Al Ain (AE); Basim Abu-Jdayil, Al Ain (AE); Yousuf Caires, Al Ain (AE); Noran Mousa, Al Ain (AE); Sabeera Haris, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 16/999,748

(22) Filed: Aug. 21, 2020

(65) Prior Publication Data

US 2022/0056262 A1 Feb. 24, 2022

(51) Int. Cl.
*C08L 67/04* (2006.01)
*C08L 97/02* (2006.01)

(52) U.S. Cl.
CPC ............... *C08L 67/04* (2013.01); *C08L 97/02* (2013.01); *C08L 2201/06* (2013.01)

(58) Field of Classification Search
CPC ................................ C08L 67/04; C08L 97/02
See application file for complete search history.

(56) References Cited

U.S. PATENT DOCUMENTS 5,964,933 A * 10/1999 Nakamura ................ C08L 1/02 106/163.01
9,347,216 B2 * 5/2016 Abu-Jdayil ............... E04B 1/76
10,655,009 B1 * 5/2020 Abu-Jdayil ............... B29B 7/92
10,843,372 B1 * 11/2020 Taleyarkhan ........ C08G 63/912
2004/0242803 A1 * 12/2004 Ohme ..................... C08L 67/04 525/400
2007/0176315 A1 * 8/2007 Hashiba ................... B27N 5/00 264/122
2009/0324917 A1 * 12/2009 Wang ......................... C08J 5/18 428/220
2010/0216909 A1 * 8/2010 Berg Gebert ........... C08L 67/04 523/128
2011/0230599 A1 * 9/2011 Deaner ................. B29C 48/865 524/13
2012/0231256 A1 * 9/2012 Huang .................... B32B 27/40 428/220
2013/0225731 A1 * 8/2013 Yin ......................... C08L 67/04 524/15
2013/0331518 A1 * 12/2013 Immonen .................. C08L 1/28 525/54.21
2014/0275355 A1 * 9/2014 Cernohous .............. C08L 99/00 524/35
2016/0068682 A1 * 3/2016 Lee ......................... C08L 97/02 524/14

FOREIGN PATENT DOCUMENTS

CN 105670248 A * 6/2016
WO WO-2015048589 A1 * 4/2015 .............. C08L 67/04

OTHER PUBLICATIONS

Gunti et al. (Polymer Composites, 2018, 39, 1125-1136). (Year: 2018).*
Bourmaud et al. (Composites: Part A 39, 2008, 1444-1454) (Year: 2008).*
Siham et al. (Scientific Research and Essays, vol. 8(21), 2013, 946-952) (Year: 2013).*
Zafar et al. (eXPRESS Polymer Letters, vol. 10, No. 2, 2016, 176-186) (Year: 2016).*
Xie et al. (BioResources, 12(3), 2017, 6736-6748) (Year: 2017).*
Nomai et al. (Macromol Symp. 2015, 354, 244-250) (Year: 2015).*
Shirai et al. (J. Polym. Environ, 2015, 23:54-61) (Year: 2015).*
Machine Translation of CN-105670248-A, 2025 (Year: 2025).*

* cited by examiner

*Primary Examiner* — Liam J Heincer
(74) *Attorney, Agent, or Firm* — MH2 Technology Law Group, LLP

(57) ABSTRACT

A bioplastic blend is disclosed. The bioplastic blend may comprise a polylactic acid polymer and a lignocellulosic biomass. The lignocellulosic biomass may be a particulate and have an average particle size that is less than or equal to 60 micrometers, or less than or equal to 50 micrometers. The lignocellulosic biomass may be a particulate and comprise greater than or equal to 50 percent by weight of the bioplastic blend, or greater than or equal to 60 percent by weight of the bioplastic blend. In addition, the bioplastic blend may comprise a plasticizer.

3 Claims, 3 Drawing Sheets

BIODEGRADGRADABLE DEVICES, AND METHODS OF MAKING THE SAME

TECHNICAL FIELD

This disclosure generally relates to biodegradable devices, and more particularly to biodegradable devices comprising a polylactic acid polymer and a lignocellulosic biomass, and further including methods of making the same.

BACKGROUND

Conventional plastic materials, such as polyethylene and polypropylene, are derived from polymers based on petroleum sources, and currently account for about 90 percent of global plastic production. These petroleum derived plastics require much time to breakdown, and in some instances never breakdown, and thus are generally considered non-biodegradable. Accordingly, once disposed into the environment, plastics based on polymers derived from petroleum sources may pose a serious threat to land and aquatic habitats.

A means to resolve this issue is to manufacture plastics utilizing polymers that are more biodegradable than those derived from petroleum sources. One such polymer is polylactic acid (PLA), and it is derived from plant-based sources. Plastics derived from plant-based sources are known in the art as bioplastics.

Global bioplastic production is expected to increase from 2.11 million tons in 2018 to 2.62 million tons in 2023. Of this tonnage, about 60 percent (1.572 million tons) is expected to be created utilizing PLA by 2023. For better or worse, PLA is generally created by fermenting starches or sugars derived from corn, cassava, or sugar cane, which are primary food sources to many persons around the world. Accordingly, until such time an economical alternate pathway to creating PLA from food sources is fleshed-out, a need exists to create a bioplastic blend that can be utilized to manufacture a biodegradable device that exhibits as good as, or better than, biodegradability than biodegradable devices manufactured with PLA alone. This, in turn, will free up corn, cassava, or sugar cane for use as a food source that would otherwise be used in the manufacture of biodegradable devices.

The present disclosure is therefore directed to overcoming one or more problems set forth above and/or other problems associated with known biodegradable devices.

SUMMARY

In accordance with one aspect of the present disclosure, a bioplastic blend is disclosed. The bioplastic blend may comprise a polylactic acid polymer and a lignocellulosic biomass. The lignocellulosic biomass may be a particulate lignocellulosic biomass, and the particulate lignocellulosic biomass may have an average particle size less than or equal to 60 micrometers. Alternatively, the particulate lignocellulosic biomass may have an average particle size less than or equal to 50 micrometers.

The particulate lignocellulosic biomass may comprise greater than or equal to 50 percent by weight of the bioplastic blend. The particulate lignocellulosic biomass may even be greater than or equal to 60 percent by weight of the bioplastic blend. Further, the particulate lignocellulosic biomass may be selected from at least one of the following group, consisting of switch grass lignocellulosic biomass, elephant grass lignocellulosic biomass, miscanthus grass lignocellulosic biomass, date palm tree lignocellulosic biomass, willow tree lignocellulosic biomass, poplar tree lignocellulosic biomass, and sawmill lignocellulosic biomass.

The bioplastic blend may additionally include a plasticizer. The plasticizer may be selected from the group consisting of at least one of the group consisting of epoxidized palm oil, epoxidized palm olein, epoxidized soybean oil, poly(ethylene glycol), 1-lactide, triethyl citrate, acetyl tributyl citrate, di-2-ethylhexyl adipate, diisodecyl adipate, di-2-ethylhexyl azelate, dipropylene glycol dibenzoate, tricresyl phosphate, cresyl diphenyl phosphate, 2-ethylhexyl diphenyl phosphate, di-n-octyl phenyl phosphate, tri-n-hexyl phosphate, diethyl phthalate, butyl benzyl phthalate, di-2-ethylhexyl phthalate, diisodecyl phthalate, di-2-ethylhexyl sebacate, and di-2-ethylhexyl terephthalate.

In accordance with another aspect of the present disclosure, a biodegradable device is disclosed. The biodegradable device may comprise a polylactic acid polymer and a lignocellulosic biomass. The lignocellulosic biomass may be a particulate lignocellulosic biomass, and the particulate lignocellulosic biomass may have an average particle size less than or equal to 60 micrometers. Alternatively, the particulate lignocellulosic biomass may have an average particle size less than or equal to 50 micrometers.

The particulate lignocellulosic biomass may comprise greater than or equal to 50 percent by weight of the biodegradable device. The particulate lignocellulosic biomass may even be greater than or equal to 60 percent by weight of the biodegradable device. Further, the lignocellulosic biomass may be selected from at least one of the following group, consisting of switch grass lignocellulosic biomass, elephant grass lignocellulosic biomass, miscanthus grass lignocellulosic biomass, date palm tree lignocellulosic biomass, willow tree lignocellulosic biomass, poplar tree lignocellulosic biomass, and sawmill lignocellulosic biomass.

The biodegradable device may additionally include a plasticizer. The plasticizer may be selected from the group consisting of at least one of the group consisting of epoxidized palm oil, epoxidized palm olein, epoxidized soybean oil, poly(ethylene glycol), 1-lactide, triethyl citrate, acetyl tributyl citrate, di-2-ethyl hexyl adipate, diisodecyl adipate, di-2-ethylhexyl azelate, dipropylene glycol dibenzoate, tricresyl phosphate, cresyl diphenyl phosphate, 2-ethylhexyl diphenyl phosphate, di-n-octyl phenyl phosphate, tri-n-hexyl phosphate, diethyl phthalate; butyl benzyl phthalate, di-2-ethylhexyl phthalate, diisodecyl phthalate, di-2-ethylhexyl sebacate, and di-2-ethyl terephthalate.

In accordance with an additional aspect of the present disclosure, a method of manufacturing a biodegradable device is disclosed. Generally, the method may include the steps of comminuting a starting lignocellulosic biomass to create a particulate lignocellulosic biomass, the particulate lignocellulosic biomass having an average particle size less than the starting lignocellulosic biomass. Subsequently the particulate lignocellulosic biomass may be mixed with a polylactic acid polymer in an extruder to create a bioplastic blend. Finally, the bioplastic blend may be molded to create the biodegradable device. The molding step may be selected from the group consisting of injection molding and compression molding.

The particulate lignocellulosic biomass used to create the biodegradable device may have an average particle size less than or equal to 60 micrometers. Alternatively, the particulate lignocellulosic biomass used to create the biodegradable device may have an average particle size less than or equal to 50 micrometers. The particulate lignocellulosic biomass may comprise greater than or equal to 50 percent by weight of the biodegradable device. In other instances, the particulate lignocellulosic biomass may comprise greater than or equal to 60 percent by weight of the biodegradable device.

Additionally, the method of creating the biodegradable device may further include the step of sieving the particulate lignocellulosic biomass prior to mixing it with the polylactic acid polymer to create a sieved particulate lignocellulosic biomass, the sieved particulate lignocellulosic biomass having an average particle size less than or equal to 60 micrometers. In other instances, the sieved particulate lignocellulosic biomass may have an average particle size less than or equal to 50 micrometers.

Additionally, the mixing step may further include mixing a plasticizer with the lignocellulosic biomass and the polylactic acid polymer in the extruder to create the bioplastic blend, the plasticizer selected from at least one of the group consisting of epoxidized palm oil, epoxidized palm olein, epoxidized soybean oil, poly(ethylene glycol), 1-lactide, triethyl citrate, acetyl tributyl citrate, di-2-ethylhexyl adipate, diisodecyl adipate, di-2-ethylhexyl azelate, dipropylene glycol dibenzoate, tricresyl phosphate, cresyl diphenyl phosphate, 2-ethylhexyl diphenyl phosphate, di-n-octyl phenyl phosphate, tri-n-hexyl phosphate, diethyl phthalate, butyl benzyl phthalate, di-2-ethylhexyl phthalate, diisodecyl phthalate, di-2-ethylhexyl sebacate, and di-2-ethylhexyl terephthalate.

BRIEF DESCRIPTION

DETAILED DESCRIPTION OF THE DISCLOSURE

Figure 1:
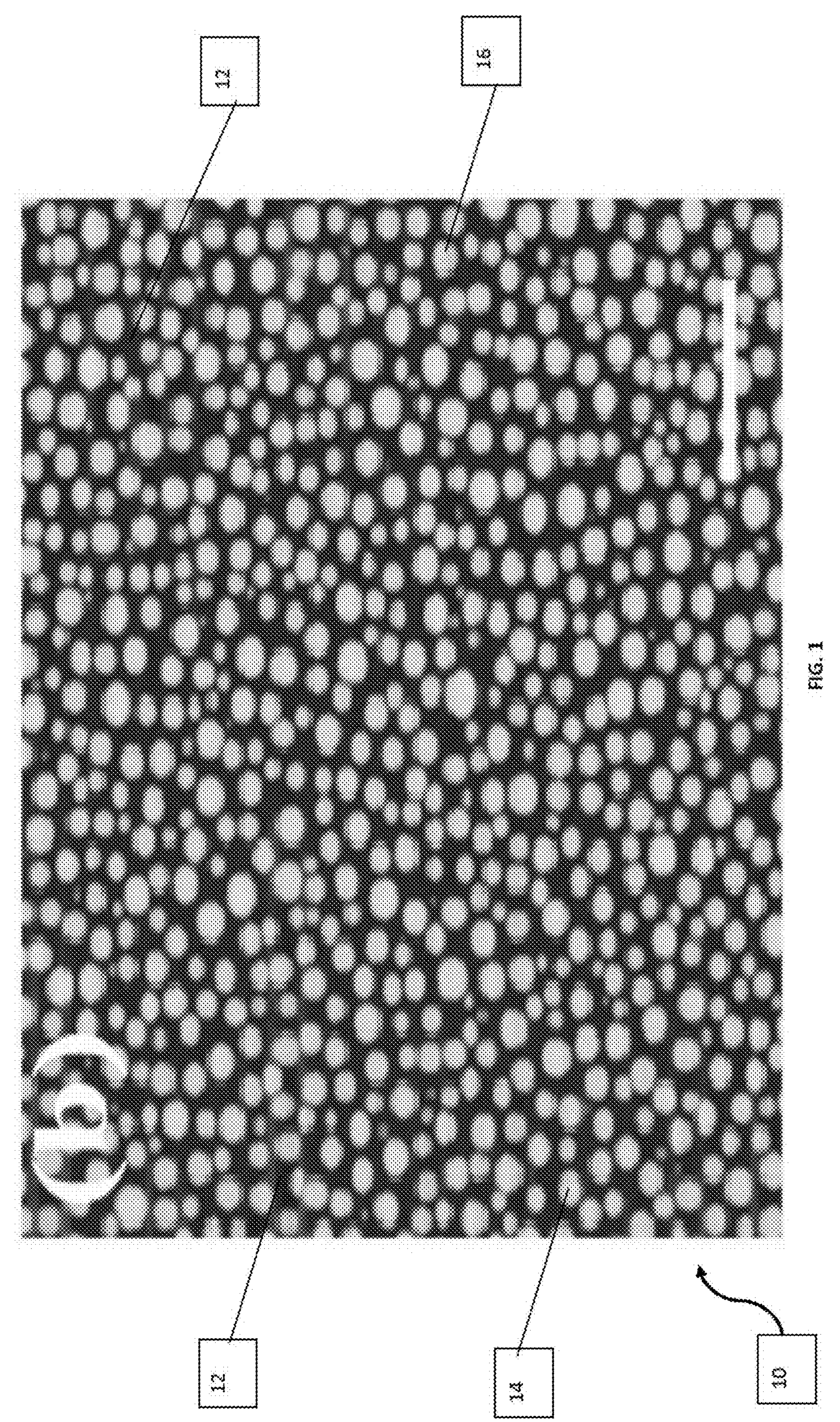
FIG. 1 is schematic illustrating an exemplary bioplastic blend made in accordance with the present disclosure.

Various aspects of the disclosure will now be described with reference to the drawings, wherein like reference numbers refer to like elements, unless specified otherwise. Referring to FIG. 1, a schematic of an exemplary bioplastic blend 10 is illustrated, according to an aspect of the disclosure. As represented therein, the bioplastic blend 10 may comprise a polylactic acid polymer 12 and a lignocellulosic biomass 14. As depicted, the polylactic acid polymer 12 may be distinct from the lignocellulosic biomass 14, and more particularly, the lignocellulosic biomass 14 may be a particulate lignocellulosic biomass 16, having a particulate shape and form.

Being a particle, the particulate lignocellulosic biomass 16 may have an average particle size. In one embodiment, the average particle size of the particulate lignocellulosic biomass 16 may be less than or equal to 100 micrometers. In another embodiment, the average particle size of the particulate lignocellulosic biomass 16 may be less than or equal to 99 micrometers, 98 micrometers, 97 micrometers, 96 micrometers, 95 micrometers, 94 micrometers, 93 micrometers, 92 micrometers, 91 micrometers, 90 micrometers. 89 micrometers, 88 micrometers, 87 micrometers, 86 micrometers, 85 micrometers; 84 micrometers, 83 micrometers, 82 micrometers, 81 micrometers, 80 micrometers, 79 micrometers, 77 micrometers, 76 micrometers, 75 micrometers, 74 micrometers, 73 micrometers, 72 micrometers, 71 micrometers, 70 micrometers, 69 micrometers, 68 micrometers, 67 micrometers, 66 micrometers, 65 micrometers, 64 micrometers, 63 micrometers, 62 micrometers, 61 micrometers, 60 micrometers, 59 micrometers, 58 micrometers, 57 micrometers, 56 micrometers, 55 micrometers, 54 micrometers, 53 micrometers, 52 micrometers, or 51 micrometers. In a preferred embodiment, the average particle size of the particulate lignocellulosic biomass 16 may be less than or equal to 50 micrometers.

Additionally, the particulate lignocellulosic biomass 16 may comprise greater than or equal to 40 percent by weight of the bioplastic blend 10. In another embodiment, the particulate lignocellulosic biomass 16 may comprise greater than or equal to 41 percent by weight, 42 percent by weight, 43 percent by weight, 44 percent by weight, 45 percent by weight, 46 percent by weight, 47 percent by weight, 48 percent by weight, 49 percent by weight, 50 percent by weight, 51 percent by weight, percent by weight, 53 percent by weight, 54 percent by weight. 55 percent by weight, 56 percent by weight, 57 by weight, 58 percent by weight, or 59 percent by weight of the bioplastic blend. In a preferred embodiment, the particulate lignocellulosic biomass 16 may be greater than or equal to 60 percent by weight of the bioplastic blend 10.

The lignocellulosic biomass 14 and particulate lignocellulosic biomass 16 of the present disclosure may be derived from multiple sources. In one instance the source for the lignocellulosic biomass 14 and the particulate lignocellulosic biomass 16 may be switch grass. In other instances, the source for the lignocellulosic biomass 14 and particulate lignocellulosic biomass 16 may be elephant grass, miscanthus grass, willow trees, poplar trees and even waste from a sawmill. In a preferred embodiment, the source for the lignocellulosic biomass 14 and particulate lignocellulosic biomass 16 may be date palm trees.

A plasticizer may be added to the bioplastic blend 10, altering its glass transition temperature ($T_g$), and thereby modifying the brittleness of any article of manufacture created with the blend 10. While not meant to be exhaustive, some plasticizers that may be utilized with the bioplastic blend 10 include epoxidized palm oil, epoxidized palm olein, epoxidized soybean oil, poly(ethylene glycol), 1-lactide, triethyl citrate, and acetyl tributyl citrate. Other plasticizers that may be used include di-2-ethylhexyl adipate, diisodecyl adipate, di-2-ethylhexyl azelate, dipropylene glycol dibenzoate, tricresyl phosphate, cresyl diphenyl phosphate, 2-ethylhexyl diphenyl phosphate, di-n-octyl phenyl phosphate, tri-n-hexyl phosphate, diethyl phthalate, butyl benzyl phthalate, di-2-ethylhexyl phthalate, diisodecyl phthalate, di-2-ethylhexyl sebacate, and terephthalate. Additionally, a compatible mixture of two or more of the above listed plasticizers may be utilized.

A biodegradable device may be created with the above described bioplastic blend 10. Without intending to be limiting, biodegradable devices envisioned include single-use disposable utensils. These include forks, knives, spoons, chopsticks, straws, and the like. Other biodegradable devices envisioned with the bioplastic blend 10 described above include shopping bags, and food containers.

INDUSTRIAL APPLICABILITY

Figure 2:
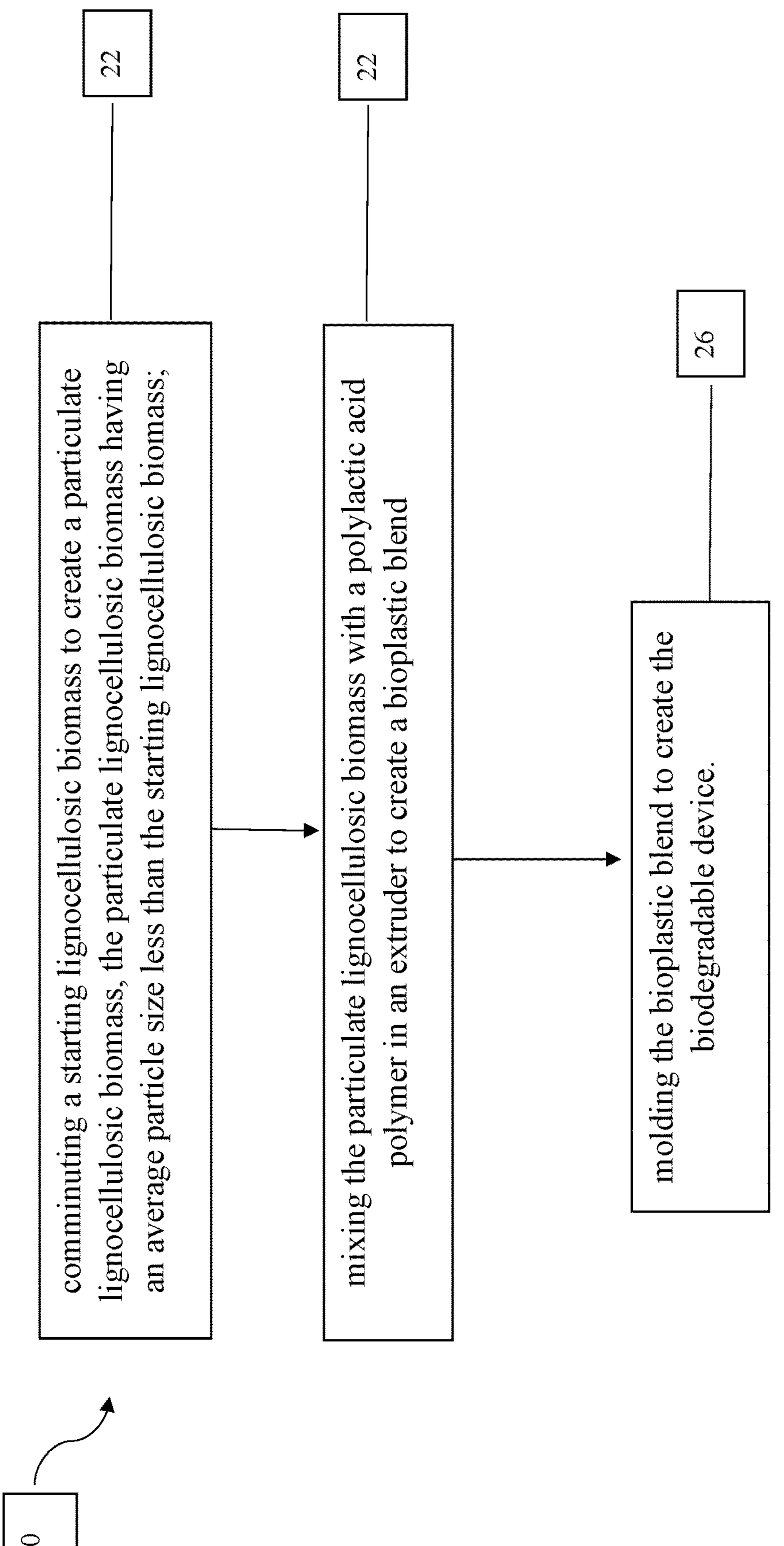
FIG. 2 is a flowchart illustrating exemplary steps of a method for manufacturing a biodegradable device utilizing a bioplastic blend made in accordance with the present disclosure.

In operation, the teachings of the present disclosure can find applicability in many industrial applications, such as, but not limited to, a method of manufacturing a biodegradable device, including forks, knives, spoons, chopsticks, straws, and the like. Referring now to FIG. 2, a flowchart illustrating exemplary steps of a method for manufacturing a biodegradable device utilizing the bioplastic blend 10 of the present disclosure is depicted, and generally referred to by 20. At step 22, a lignocellulosic biomass 14 is comminuted to create a particulate lignocellulosic biomass 16. The particulate lignocellulosic biomass 16 may have an average particle size that is less than or equal to the lignocellulosic biomass 14. The lignocellulosic biomass may be comminuted by any acceptable method, such as by grinding, shearing, ball milling, crushing, and the like.

As described above, the average particle size of the particulate lignocellulosic biomass 16 may be less than or equal to 100 micrometers. In another embodiment, the average particle size of the particulate lignocellulosic biomass 16 may be less than or equal to 99 micrometers, 98 micrometers, 97 micrometers,) 96 micrometers, 95 micrometers, 94 micrometers, 93 micrometers, 92 micrometers, 91 micrometers, 90 micrometers. 89 micrometers. 88 micrometers, 87 micrometers, 86 micrometers, 85 micrometers, 84 micrometers, 83 micrometers, 82 micrometers, 81 micrometers, 80 micrometers, 79 micrometers, 77 micrometers, 76 micrometers, 75 micrometers, 74 micrometers, 73 micrometers, 72 micrometers, 71 micrometers, 70 micrometers, 69 micrometers, 68 micrometers, 67 micrometers, 66 micrometers, 65 micrometers, 64 micrometers, 63 micrometers, 62 micrometers, 61 micrometers, 60 micrometers, 59 micrometers, 58 micrometers, 57 micrometers, 56 micrometers, 55 micrometers, 54 micrometers, 53 micrometers, 52 micrometers, or 51 micrometers. In a preferred embodiment, the average particle size of the particulate lignocellulosic biomass 16 may be less than or equal to 50 micrometers.

Subsequently, at step 24 the particulate lignocellulosic biomass 16 may be mixed with a polylactic acid polymer 12 in an extruder to create the bioplastic blend 10. The particulate lignocellulosic biomass 16 may comprise greater than or equal to 40 percent by weight of the bioplastic blend 10. In another embodiment, the particulate lignocellulosic biomass 16 may comprise greater than or equal to 41 percent by weight, 42 percent by weight, 43 percent by weight, 44 percent by weight, 45 percent by weight, 46 percent by weight, 47 percent by weight, 48 percent by weight, 49 percent by weight, 50 percent by weight, 51 percent by weight, 52 percent by weight, 53 percent by weight, 54 percent by weight, 55 percent by weight, 56 percent by weight, 57 by weight, 58 percent by weight, or 59 percent by weight of the bioplastic blend 10. In a preferred embodiment, the particulate lignocellulosic biomass 16 may be greater than or equal to 60 percent by weight of the bioplastic blend 10.

Next, at step 26, the bioplastic blend 10 may be molded to create the biodegradable device, such as, but not limited to forks, knives, spoons, chopsticks, straws, and the like. In one instance, the biodegradable device may be manufactured more economically with compression molding, while in another instance the biodegradable device may be manufactured with injection molding. Other molding techniques known in the art are within the scope of this disclosure.

Because the bioplastic blend 10 in method 20 may have varying amounts of particulate lignocellulosic biomass 16, the biodegradable device may comprise greater than or equal to 40 percent by weight, 41 percent by weight, 42 percent by weight, 43 percent by weight, 44 percent by weight, 45 percent by weight, 46 percent by weight, 47 percent by weight, 48 percent by weight, 49 percent by weight, 50 percent by weight, 51 percent by weight, 52 percent by weight, 53 percent by weight, 54 percent by weight, 55 percent by weight, 56 percent by weight, 57 by weight, 58 percent by weight, or 59 percent by weight particulate lignocellulosic biomass 16. In a preferred embodiment, the particulate lignocellulosic biomass 16 may comprise greater than or equal to 60 percent by weight of the biodegradable device.

Additionally, the lignocellulosic biomass 14, and thus the particulate lignocellulosic biomass 16, may be derived from multiple sources. In one instance the source for the lignocellulosic biomass 14 and the particulate lignocellulosic biomass 16 may be switch grass. In other instances, the source for the lignocellulosic biomass 14 and particulate lignocellulosic biomass 16 may be elephant grass, miscanthus grass, willow trees, poplar trees and even waste from a sawmill. In a preferred embodiment, the source for the lignocellulosic biomass 14 and particulate lignocellulosic biomass 16 may be date palm trees.

As described before, a plasticizer may be utilized in the bioplastic blend 10 altering its glass transition temperature ($T_g$), thereby modifying the brittleness of any article of manufacture created with the blend 10. Accordingly, the biodegradable device made by method 20 may also include a plasticizer. While not meant to be exhaustive, some plasticizers that may be utilized with the bioplastic blend 10 include epoxidized palm oil, epoxidized palm olein, epoxidized soybean oil, poly(ethylene glycol), 1-lactide, triethyl citrate, and acetyl tributyl citrate. Other plasticizers that may be used include di-2-ethylhexyl adipate, diisodecyl adipate, di-2-ethylhexyl azelate, dipropylene glycol dibenzoate, tricresyl phosphate, cresyl diphenyl phosphate, 2-ethylhexyl diphenyl phosphate, di-n-octyl phenyl phosphate, tri-n-hexyl phosphate, diethyl phthalate, butyl benzyl phthalate, di-2-ethylhexyl phthalate, diisodecyl phthalate, di-2-ethylhexyl sebacate, and di-2-ethylhexyl terephthalate. Additionally, a compatible mixture of two or more of the above described plasticizers may be utilized.

Figure 3:
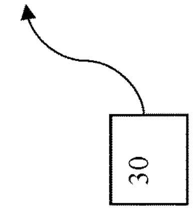
FIG. 3 is a flowchart illustrating exemplary steps of an alternative method for manufacturing a biodegradable device utilizing a bioplastic blend made in accordance with the present disclosure.
Figure 3:
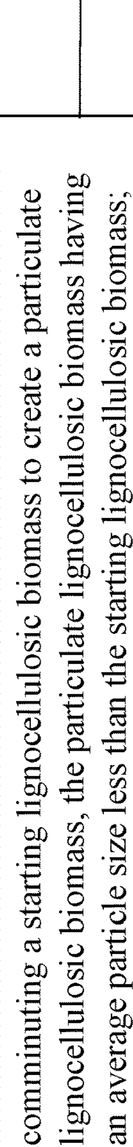

Referring now to FIG. 3, a flowchart illustrating exemplary steps of an alternative method for manufacturing a biodegradable device utilizing a bioplastic blend 10 made in accordance with the present disclosure is depicted and generally referred to by 30. At step 32, a lignocellulosic biomass 14 is comminuted to create a particulate lignocellulosic biomass. The particulate lignocellulosic biomass 16 may have an average particle size that is less than or equal to the lignocellulosic biomass 14. The lignocellulosic biomass may be comminuted by any acceptable method, such as by grinding, shearing, ball milling, crushing, and the like.

At step 34, the particulate lignocellulosic biomass 16 may be sieved to create a sieved particulate lignocellulosic biomass. The average particle size of the sieved particulate lignocellulosic biomass may be less than or equal to 100 micrometers. In another embodiment, the average particle size of the sieved particulate lignocellulosic biomass may be less than or equal to 99 micrometers, 98 micrometers, 97 micrometers, 96 micrometers, 95 micrometers, 94 micrometers, 93 micrometers, 92 micrometers, 91 micrometers, 90 micrometers, 89 micrometers, 88 micrometers, 87 micrometers, 86 micrometers, 85 micrometers, 84 micrometers, 83 micrometers, 82 micrometers, 81 micrometers, 80 micrometers, 79 micrometers, 77 micrometers, 76 micrometers, 75 micrometers, 74 micrometers, 73 micrometers, 72 micrometers, 71 micrometers, 70 micrometers, 69 micrometers, 68 micrometers, 67 micrometers, 66 micrometers, 65 micrometers. 64 micrometers. 63 micrometers, 62 micrometers, 61 micrometers, 60 micrometers, 59 micrometers, 58 micrometers, 57 micrometers, 56 micrometers, 55 micrometers. 54 micrometers, 53 micrometers, 52 micrometers, or 51 micrometers. In a preferred embodiment, the average particle size of the sieved particulate lignocellulosic biomass may be less than or equal to 50 micrometers. In a preferred embodiment, step 34 takes place before any subsequent steps, such as mixing with a polylactic acid polymer.

Subsequently, at step 36 the sieved particulate lignocellulosic biomass may be mixed with a polylactic acid polymer 12 in an extruder to create the bioplastic blend 10. The sieved particulate lignocellulosic biomass may comprise greater than or equal to 40 percent by weight of the bioplastic blend 10. In another embodiment, the sieved particulate lignocellulosic biomass may comprise greater than or equal to 41 percent by weight, 42 percent by weight, 43 percent by weight, 44 percent by weight, 45 percent by weight, 46 percent by weight, 47 percent by weight, 48 percent by weight, 49 percent by Weight, 50 percent by weight, 51 percent by weight. 52 percent by weight, 53 percent by weight, 54 percent by weight, 55 percent by weight, 56 percent by weight, 57 by weight, 58 percent by weight, or 59 percent by weight of the bioplastic blend 10. In a preferred embodiment, the sieved particulate lignocellulosic biomass may be greater than or equal to 60 percent by weight of the bioplastic blend 10.

Next, at step 38, the bioplastic blend 10 may be molded to create the biodegradable device, such as, but not limited to forks, knives, spoons, chopsticks, straws, and the like. In one instance, the biodegradable device may be manufactured more economically with compression molding, while in another instance the biodegradable device may be manufactured with injection molding. Other molding techniques known in the art are within the scope of this disclosure.

Because the bioplastic blend 10 in method 30 may have varying amounts of sieved particulate lignocellulosic biomass, the biodegradable device may comprise greater than or equal to 40 percent by weight, 41 percent by weight, 42 percent by weight, 43 percent by weight, 44 percent by weight, 45 percent by weight, 46 percent by weight, 47 percent by weight, 48 percent by weight, 49 percent by weight, 50 percent by weight, 51 percent by weight, 52 percent by weight, 53 percent by weight, 54 percent by weight, 55 percent by weight, 56 percent by weight, 57 by weight, 58 percent by weight, or 59 percent by weight sieved particulate lignocellulosic biomass. In a preferred embodiment, the sieved particulate lignocellulosic biomass may comprise greater than or equal to 60 percent by weight of the biodegradable device.

Additionally, the lignocellulosic biomass 14, and thus the sieved particulate lignocellulosic biomass, may be derived from multiple sources. In one instance the source for the lignocellulosic biomass 14 and the sieved particulate lignocellulosic biomass may be switch grass. In other instances, the source for the lignocellulosic biomass 14 and sieved particulate lignocellulosic biomass may be elephant grass, miscanthus grass, willow trees, poplar trees and even waste from a sawmill. In a preferred embodiment, the source for the lignocellulosic biomass 14 and sieved particulate lignocellulosic biomass may be date palm trees.

As described before, a plasticizer may be utilized in the bioplastic blend 10 altering its glass transition temperature ($T_g$), thereby modifying the brittleness of any article of manufacture created with the blend 10. Accordingly, the biodegradable device created by method 30 may also include a plasticizer. While not meant to be exhaustive, some plasticizers that may be utilized with the bioplastic blend 10 include epoxidized palm oil, epoxidized palm olein, epoxidized soybean oil, poly(ethylene glycol), 1-lactide, triethyl citrate, and acetyl tributyl citrate. Other plasticizers that may be used include di-2-ethylhexyl adipate, diisodecyl adipate, di-2-ethylhexyl azelate, dipropylene dibenzoate, tricresyl phosphate, cresyl diphenyl phosphate, 2-ethylhexyl diphenyl phosphate, di-n-octyl phenyl phosphate, tri-n-hexyl phosphate, diethyl phthalate, butyl benzyl phthalate, di-2-ethylhexyl phthalate, diisodecyl phthalate, di-2-ethylhexyl sebacate, and di-2-ethylhexyl terephthalate. Additionally, a compatible mixture of two or more of the above described plasticizers may be utilized.

The above description is meant to be representative only, and thus modifications may be made to the embodiments described herein without departing from the scope of the disclosure. Thus, these modifications fall within the scope of the present disclosure and are intended to fall within the appended claims.

What is claimed is:

1. A method of manufacturing a molded biodegradable device, comprising:

comminuting a starting lignocellulosic biomass to create a particulate lignocellulosic biomass, the particulate lignocellulosic biomass having an average particle size less than the starting lignocellulosic biomass, wherein the particulate lignocellulosic biomass has an average particle size less than or equal to 60 micrometers, and wherein the lignocellulosic biomass is selected from at least one of the group consisting of *miscanthus* grass lignocellulosic biomass, date palm tree lignocellulosic biomass, willow tree lignocellulosic biomass, poplar tree lignocellulosic biomass, and sawmill waste lignocellulosic biomass, and wherein the non-cellulosic material is not separated or removed from the lignocellulosic biomass;

mixing the particulate lignocellulosic biomass with a biodegradable polymer consisting of a polylactic acid polymer in an extruder to create a bioplastic blend;

mixing a plasticizer with the bioplastic blend in the extruder to create a moldable bioplastic blend, wherein the plasticizer is selected from at least one of the group consisting of epoxidized palm oil, epoxidized palm olein, epoxidized soybean oil, 1-lactide, di-2-ethylhexyl azelate, dipropylene glycol dibenzoate, tricresyl phosphate, cresyl diphenyl phosphate, 2-ethylhexyl diphenyl phosphate, di-n-octyl phenyl phosphate, tri-n-hexyl phosphate, diethyl phthalate, butyl benzyl phthalate, di-2-ethylhexyl phthalate, diisodecyl phthalate, di-2-ethylhexyl sebacate, and di-2-ethylhexyl terephthalate; and molding the moldable bioplastic blend to create the molded biodegradable device in which the particulate lignocellulosic biomass comprises greater than 60 percent by weight of the molded biodegradable device.

2. The method of manufacturing a molded biodegradable device according to claim 1, further comprising sieving the particulate lignocellulosic biomass prior to mixing it with the polylactic acid polymer to create a sieved particulate lignocellulosic biomass, the sieved particulate lignocellulosic biomass having an average particle size less than or equal to 60 micrometers.

3. The method of manufacturing a molded biodegradable device according to claim 1, wherein the molding step is selected from the group consisting of injection molding and compression molding.

* * * * *